US010562554B2

(12) United States Patent
Cho et al.

(10) Patent No.: US 10,562,554 B2
(45) Date of Patent: Feb. 18, 2020

(54) CENTRAL PROCESSING UNIT MODULE FOR PROCESSING RAILWAY SIGNAL

(71) Applicant: LSIS CO., LTD., Anyang-si, Gyeonggi-do (KR)

(72) Inventors: Yong-Gee Cho, Anyang-si (KR); Dong-Han Woo, Anyang-si (KR); Yung Bang, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 350 days.

(21) Appl. No.: 15/351,503

(22) Filed: Nov. 15, 2016

(65) Prior Publication Data

US 2017/0259836 A1 Sep. 14, 2017

(30) Foreign Application Priority Data

Mar. 8, 2016 (KR) ........................ 10-2016-0027471

(51) Int. Cl.
*B61L 27/00* (2006.01)
*B61L 15/00* (2006.01)
*G05B 19/042* (2006.01)

(52) U.S. Cl.
CPC ....... *B61L 27/0061* (2013.01); *B61L 15/0063* (2013.01); *B61L 27/0038* (2013.01); *G05B 19/042* (2013.01)

(58) Field of Classification Search
None
See application file for complete search history.

(56) References Cited

U.S. PATENT DOCUMENTS 3,696,758 A * 10/1972 Godinez, Jr. ........... B60L 15/32
105/61
2011/0026411 A1 * 2/2011 Hao .................. H04L 12/40189
370/249

(Continued)

FOREIGN PATENT DOCUMENTS

JP 2510472 B2 4/1996
JP 2014-048850 A 3/2014

(Continued)

OTHER PUBLICATIONS

Lee Jong Seong, machine translation of KR-101211912-B1, Dec. 2012, espacenet.com (Year: 2012).*

*Primary Examiner* — David P. Merlino
(74) *Attorney, Agent, or Firm* — K&L Gates LLP

(57) ABSTRACT

The present disclosure relates to a CPU module for processing railway signals. The CPU module includes a first input unit that receives an input signal from an external apparatus; a second input unit that receives a second input signal and a second instruction signal from a CPU checking module; a first comparison unit that compares the two input signals and outputs a resulting input signal if it is determined that the two signals are identical; a signal processing unit that converts the resulting input signal into a first instruction signal; and a second comparison unit that compares the first instruction signal with the second instruction signal and outputs a resulting instruction signal if it determines the two instruction signals are identical; and a control unit that sends a synchronization signal for controlling operation timing of the two comparison units, the signal processing unit, and the CPU checking module.

3 Claims, 4 Drawing Sheets

(56) References Cited

U.S. PATENT DOCUMENTS

2015/0172162 A1\* 6/2015 Vaananen ............... H04L 43/50
                                                    714/715
2015/0193341 A1\* 7/2015 Ye ........................... G06F 9/522
                                                    711/202
2017/0129515 A1\* 5/2017 Weber ..................... B61L 23/00

FOREIGN PATENT DOCUMENTS

| KR | 10-1211912 B1 | | 12/2012 |
|---|---|---|---|
| KR | 101211912 B1 | \* | 12/2012 |
| KR | 10-2014-0140192 A | | 12/2014 |

\* cited by examiner

PRIOR ART

CENTRAL PROCESSING UNIT MODULE FOR PROCESSING RAILWAY SIGNAL

CROSS REFERENCE TO RELATED APPLICATION

This application claims the benefit of Korean Patent Application No. 10-2016-0027471, filed on Mar. 8, 2016, entitled "CENTRAL PROCESSING UNIT MODULE FOR PROCESSING RAILWAY SIGNAL", which is hereby incorporated by reference in its entirety into this application.

BACKGROUND

1. Technical Field

The present disclosure relates to a CPU module for processing railway signals, and more specifically to a CPU module for processing railway signals that controls operation timing of a first comparison unit, a signal processing unit and a second comparison unit.

2. Description of the Related Art

A railway is important means of transportation along which a train consisting of a series of vehicles that transport cargo or passengers travels.

In order to operate railways, it is necessary to transmit/receive numerous railway signals for monitoring or controlling location and speed of trains, an interval between trains, stopping of a train, etc. For well-organized and stable monitoring and controlling of railways, it is necessary to transmit/receive accurate information.

For example where there are two trains traveling along a railway, if location information of the preceding train transmitted to the following train has a defect such as noise, the trains may collide with each other such that a big accident take place. In addition, if a signal for controlling a barricade at a level-crossing is oppositely transmitted due to noise, a train may collide with a vehicle or a person. Accordingly, it is very important to detect an error in railway signals.

FIG. 1 is a diagram showing an existing CPU module for processing railway signals.

Referring to FIG. 1, only one CPU module is used to convert an input signal into an instruction signal. If the CPU module performs wrong calculation due to an external factor, output data having wrong value is transmitted to a site or another system, such that the site equipment or the system may perform unintended operation.

As such, existing CPU modules for processing railway signals cannot detect erroneous data, and thus site equipment or other systems may perform malfunction. If site equipment or other systems performs malfunction, trains may collide, causing a big accident.

SUMMARY

It is an aspect of the present disclosure to provide a CPU module for processing railway signals that compares a first input signal with a second input signal and compares a first instruction signal with a second instruction signal, thereby outputting reliable signals.

It is another aspect of the present disclosure to provide a CPU module for processing railway signals that controls operation timing of the first comparison unit, a signal processing unit and the second comparison unit, such that they are synchronized with signals received by a CPU module for checking.

It is yet another aspect of the present disclosure to provide a CPU module that transmits an I/O synchronization signal and an operation synchronization signal, such that a comparison unit and a signal processing unit are independently controlled.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

It is an aspect of the present disclosure to provide a CPU module including: a first input unit configured to receive a first input signal from an external apparatus; a second input unit configured to receive a second input signal and a second instruction signal from a CPU module for checking; a first comparison unit configured to compare the first input signal with the second input signal and output a resulting input signal if it is determined that the first input signal is identical to the second input signal; a signal processing unit configured to convert the resulting input signal into a first instruction signal; and a second comparison unit configured to compare the first instruction signal with the second instruction signal and output a resulting instruction signal if it is determined that the first instruction signal is identical to the second instruction signal.

According to an exemplary embodiment of the present disclosure, a CPU module for processing railway signals compares a first input signal with a second input signal and compares a first instruction signal with a second instruction signal, thereby outputting reliable signals.

In addition, according to an exemplary embodiment of the present disclosure, a CPU module for processing railway signals controls operation timing of the first comparator, a signal processing unit and the second comparator, such that they are synchronized with signals received by a CPU module for checking.

Further, according to an exemplary embodiment of the present disclosure, a CPU module transmits an I/O synchronization signal and an operation synchronization signal, such that a comparison unit and a signal processing unit are independently controlled.

DETAILED DESCRIPTION

Figure 1:
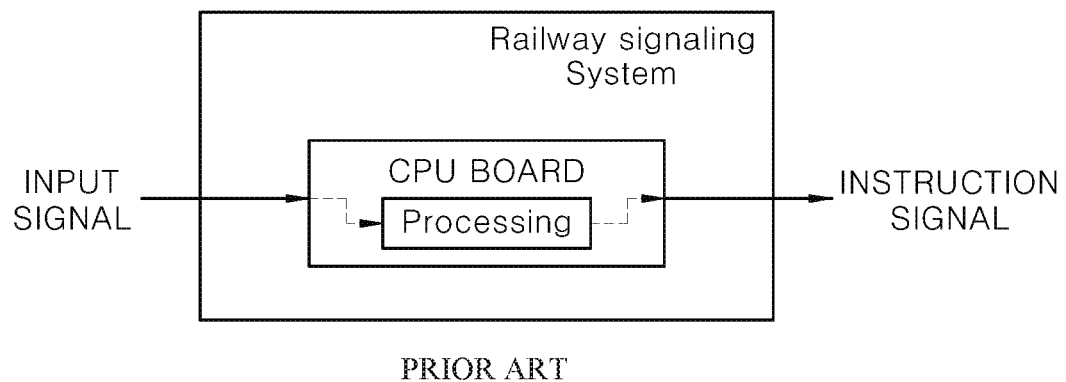
FIG. 1 is a diagram showing an existing CPU module for processing railway signals.

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
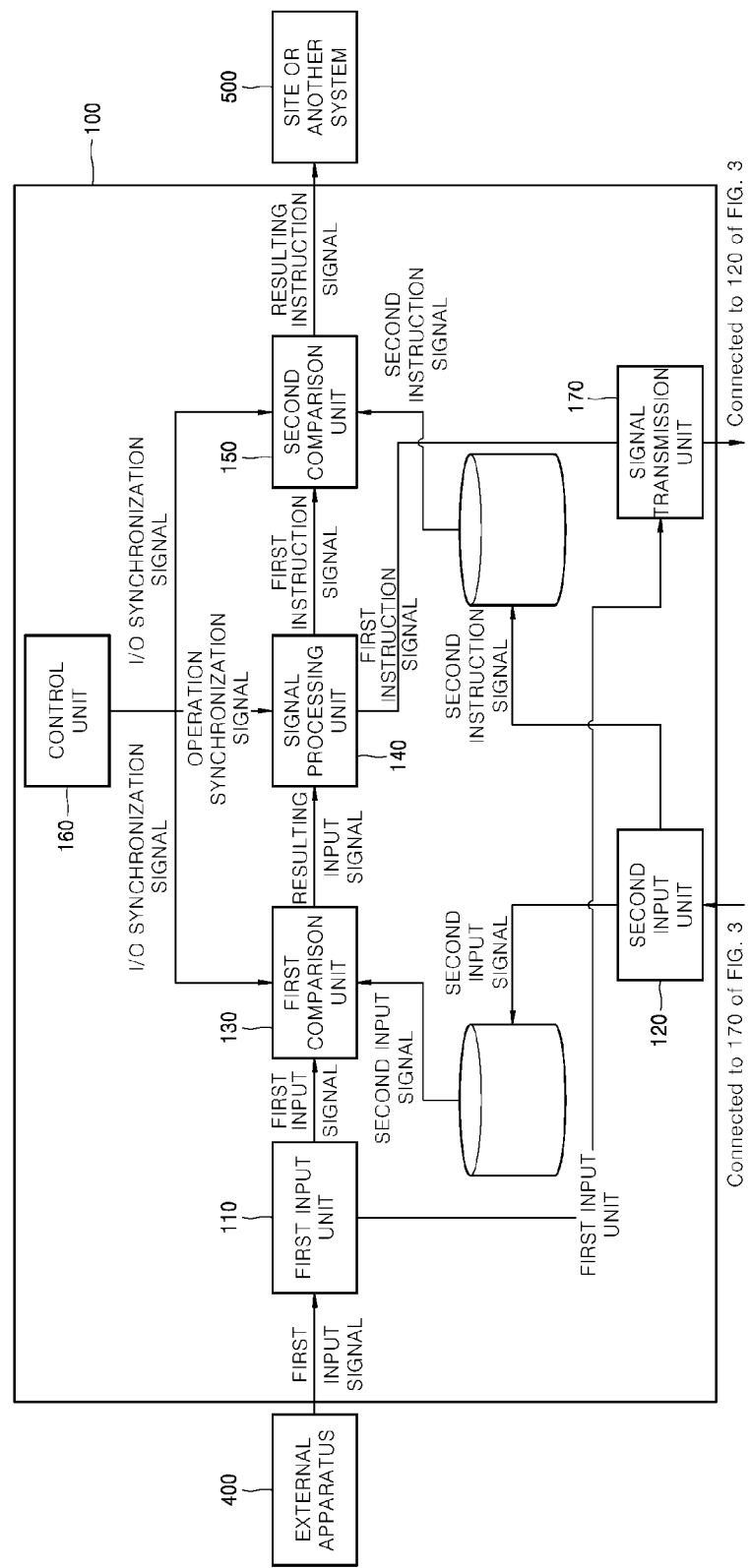
FIG. 2 is a diagram for illustrating a CPU module for processing railway signals according to an exemplary embodiment of the present disclosure.
Figure 3:
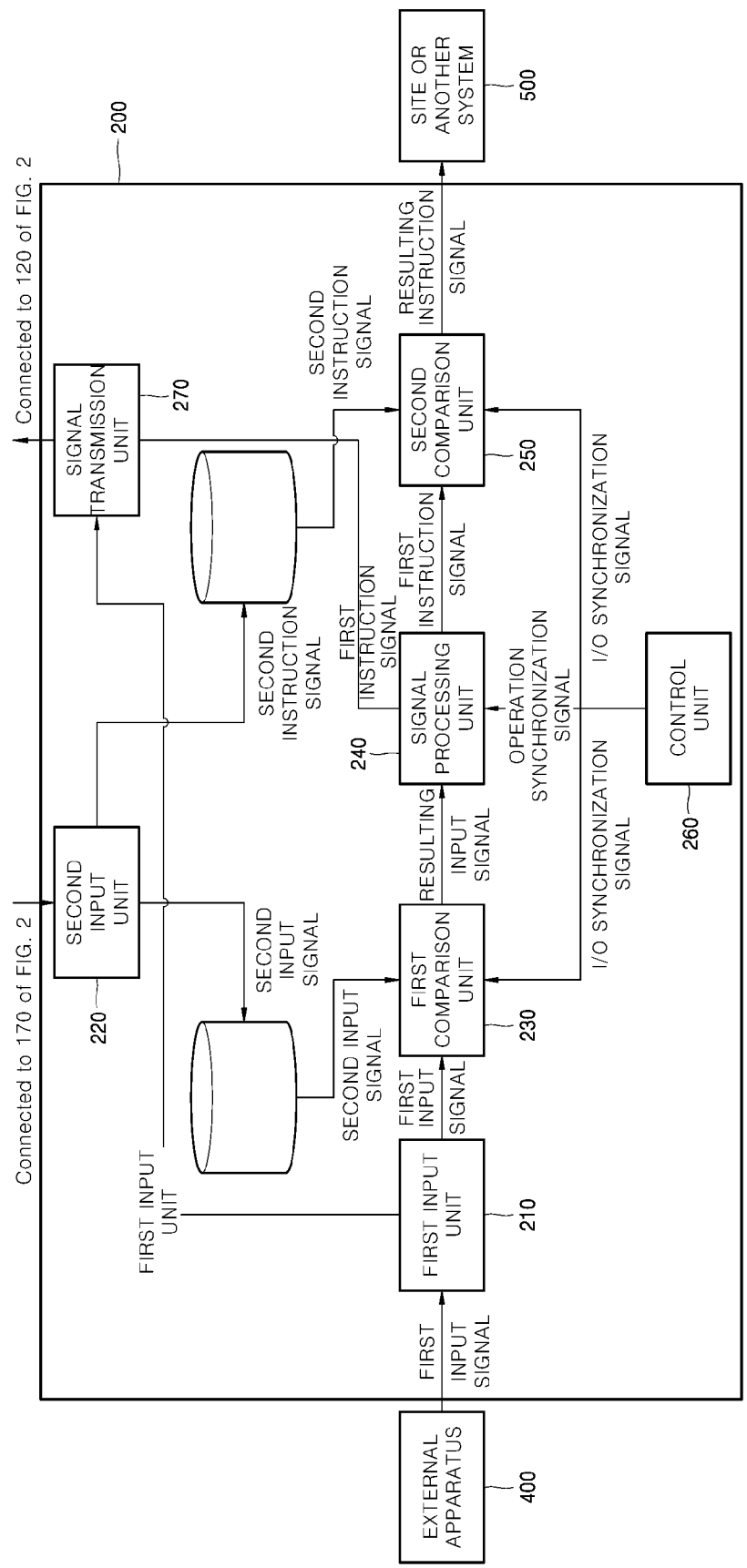
FIG. 3 is a diagram for illustrating a CPU module for checking according to an exemplary embodiment of the present disclosure.

FIG. 2 is a diagram for illustrating a CPU module for processing railway signals according to an exemplary embodiment of the present disclosure and FIG. 3 is a diagram for illustrating a CPU module for checking according to an exemplary embodiment of the present disclosure.

Referring to FIG. 2 and FIG. 3, the CPU module for processing railway signals 100 according to the exemplary embodiment of the present disclosure may include a first input unit 110, a second input unit 120, a first comparison unit 130, and a signal processing unit 140. In addition, the CPU module for processing railway signals 100 according to the exemplary embodiment of the present disclosure may include a second comparison unit 150, a control unit 160, and a signal transmission unit 170.

The CPU module for processing railway signals 100 shown in FIG. 2 is merely an exemplary embodiment of the present disclosure, and the elements are not limited to those shown in FIG. 2. Some elements may be added, modified or eliminated as desired.

A procedure for transmitting/receiving signals and comparing them by the CPU module for processing railway signals 100 will be described with reference to FIG. 2. The first input unit 110 receives a first input signal from an external apparatus 400 and then transmits the first input signal to the first comparison unit 130. The second input unit 120 receives a second input signal from a CPU module for checking 200 and then transmits the second input signal to the first comparison unit 130. The first comparison unit 130 compares the first input signal and the second input signal and transmits a resulting input signal to the signal processing unit 140 if the two signals are identical. The signal processing unit 140 converts the first input signal to a first instruction signal and then transmits the first instruction signal to the second comparison unit 150. The second comparison unit 150 compares a second instruction signal received from the second input unit 120 with the first instruction signal and outputs a resulting instruction signal if the two signals are identical.

The control unit 160 transmits a synchronization signal to the first comparison unit 130, the signal processing unit 140 and the second comparison unit 150 to thereby control operating timing of the first comparison unit 130, the signal processing unit 140 and the second comparison unit 150. For example, upon receiving an I/O synchronization signal from the control unit 160, the first comparison unit 130 compares the first input signal with the second input signal to transmit the resulting input signal.

A CPU module for checking 200 may transmit the second input signal or the second instruction signal to the CPU module for processing railway signals 100. The CPU module for processing railway signals 100 synchronizes the signals received from the CPU module for checking 200 with the first input signal or the first instruction signal, and compares them to output the resulting instruction signal. The configuration and effect of the CPU module for checking 200 may be identical to or different from those of the CPU module for processing railway signals 100. In the following description, it is assumed that the configuration and effect of the CPU module for checking 200 is identical to those of the CPU module for processing railway signals 100.

A first input unit 210 of the CPU module for checking 200 receives the first input signal from an external apparatus and then transmits the first input signal to a first comparison unit 230 of the CPU module for checking 200. The first input unit 210 of the CPU module for checking 200 and the first input unit 110 of the CPU module for processing railway signals 100 may receive the first input signal from the external apparatus 400 simultaneously.

A second input unit 220 of the CPU module for checking 200 receives the second input signal from the CPU module 100 and then transmits the second input signal to the first comparison unit 230 of the CPU module 200. The signal transmitted by the signal transmission unit 170 of the CPU module 100 becomes the second input signal in the CPU module 200.

The first comparison unit 230 of the CPU module 200 compares the first input signal with the second input signal and transmits the resulting input signal to the signal processing unit 240 of the CPU module 200 if the two signals are identical. The signal processing unit 240 of the CPU module 200 converts the first input signal into the first instruction signal and then transmits the first instruction signal to the second comparison unit 250 of the CPU module 200. The second comparator 250 of the CPU module 200 compares the second instruction signal received from the second input unit 220 of the CPU module 200 with the first instruction signal and may output the resulting instruction signal if they are identical. The second comparison unit 250 of the CPU module 200 compares the second instruction signal received from the second input unit 220 of the CPU module 200 with the first instruction signal and may not output the data if they are not identical.

The control unit 260 of the CPU module 200 transmits a synchronization signal to the first comparison unit 230, the signal processing unit 240 and the second comparison unit 250 of the CPU module 200. Then, the control unit 260 of the CPU module 200 controls the operation timing of the first comparison unit 230, the signal processing unit 240 and the second comparison unit 250 of the CPU module 200. For example, upon receiving the I/O synchronization signal from the control unit 260 of the CPU module 200, the first comparison unit 230 of the CPU module 200 compares the first input signal with the second input signal to transmit the resulting input signal.

The control units 160 and 260 may be disposed outside the CPU modules 100 and 200, respectively, or may be shared by the CPU modules 100 and 200. In either case, the CPU modules 100 and 200 may be controlled simultaneously. For example, a synchronization signal may be simultaneously transmitted to the first comparison unit 130, the signal processing unit 140 and the second comparison unit 150 of the CPU module 100 and the first comparison unit 230, the signal processing unit 240 and the second comparison unit 250 of the CPU module 200, such that the operation timing can be controlled.

The control units 160 and 260 may be disposed inside the CPU modules 100 and 200, respectively, and may transmit/receive signals to/from each other via a communications device. For example, the control unit 160 of the CPU module 100 may control the first comparison unit 130, the signal processing unit 140 and the second comparison unit 150 of the CPU module 100. The control unit 260 of the CPU module 200 may control the first comparison unit 230, the signal processing unit 240 and the second comparison unit 250 of the CPU module 200. The control units 160 and 260 may transmit/receive signal to/from each other via a communications device, such that they can control the CPU modules 100 and 200 simultaneously.

The elements of the CPU module 100 will be described in detail. The first input unit 110 may receive the first input signal from the external apparatus 400. The external apparatus 400 may be, but is not limited to, a machine, equipment, an apparatus or a system in a site, or another CPU module. The first input unit 110 receives the first input signal from the external apparatus 400 and then transmits the first input signal to the first comparison unit 130. In addition, the first input unit 110 may transmit the first input signal to the signal transmission unit 170. In addition, the first input unit 110 may transmit the first input signal to the first comparison unit 130 and the signal transmission unit 170 simultaneously or sequentially. The signal transmission unit 170 may receive the first input signal and transmit it to the CPU module 200.

The second input unit 120 may receive a second input signal and a second instruction signal from the CPU module for checking 200. The second input signal is received by the first input unit 210 of the CPU module 200 and transmitted by the signal transmission unit 270 of the CPU module 200. The second instruction signal is converted by the signal processing unit 240 of the CPU module 200 and transmitted by the signal transmission unit 270 of the CPU module 200. The second input signal and the second instruction signal are received in order to synchronize the CPU module for processing railway signals 100 with the CPU module for checking 200. The second input unit 120 may receive the second input signal and the second instruction signal simultaneously or sequentially.

The first comparison unit 130 may compare the first input signal with the second input signal and may output a resulting input signal if it is determined that the first input signal is identical to the second input signal. The resulting input signal may be the first input signal or the second input signal. The first comparison unit 130 may output the first input signal and the second input signal simultaneously.

In an exemplary embodiment of the present disclosure, the first comparison unit 130 may receive an I/O synchronization signal from the control unit 160 and then may comparison unit the first input signal with the second input signal. If it is determined that the first input signal is identical to the second input signal, a resulting input signal may be output. The I/O synchronization signal is transmitted from the control unit 160 so as to control the operation timing of the first comparison unit 130 or the second comparison unit 150. An operation synchronization signal is transmitted from the control unit 160 so as to control the operation timing of the signal processing unit 140. The first comparison unit 130 may receive the synchronization signal to thereby synchronize the first input signal of the CPU module for processing railway signals 100 with the first input signal of the CPU module for checking 200.

The signal processing unit 140 may convert the resulting input signal into the first instruction signal. The instruction signal is used to control trains, railways and crossroads, etc. Table 1 below shows an example of resulting input signals and corresponding first instruction signals converted by the signal processing unit 140.

TABLE 1

| Resulting Input Signal | Signal Processing Unit 140 | First Instruction Signal |
|---|---|---|
| A | → | Take to right at turn-off |
| B | → | Lift barricade |
| C | → | Slow down train |
| D | → | Adjust interval with preceding train |

Referring to Table 1, the signal processing unit 140 may convert the resulting input signal A into the first instruction signal to instruct to take to the right at a turn-off. In addition, the signal processing unit 140 may convert the resulting input signal B into the first instruction signal to lift a barricade at a level-crossing. In an exemplary embodiment of the present disclosure, the signal processing unit 140 may receive the operation synchronization signal from the control unit 160 and then may convert the resulting input signal into the first instruction signal. In addition, the signal processing unit 140 may receive the I/O synchronization signal and then may transmit the first instruction signal to the second comparison unit 150.

In addition, the signal processing unit 140 may transmit the first instruction signal to the signal transmission unit 170. The signal processing unit 140 may transmit the first instruction signal to the second comparison unit 150 and the signal transmission unit simultaneously or sequentially. The signal transmission unit 170 may receive the first instruction signal and transmit it to the CPU module for checking 200.

The second comparison unit 150 may compare the first instruction signal with the second instruction signal and may output a resulting instruction signal if it is determined that the first instruction signal is identical to the second instruction signal. Since the resulting instruction signal is output when the first instruction signal is identical to the second instruction signal, a reliable signal can be output.

In an exemplary embodiment of the present disclosure, the second comparator 150 may receive the I/O synchronization signal from the control unit 160 to then compare the first instruction signal with the second instruction signal, and may output the resulting instruction signal if it is determined that the first instruction signal is identical to the second instruction signal.

The control unit 160 may transmit a synchronization signal for controlling the operation timing of the first comparison unit 130, the signal processing unit 140 and the second comparison unit 150. The synchronization signal may be either an I/O synchronization signal or an operation synchronization signal.

Figure 4:
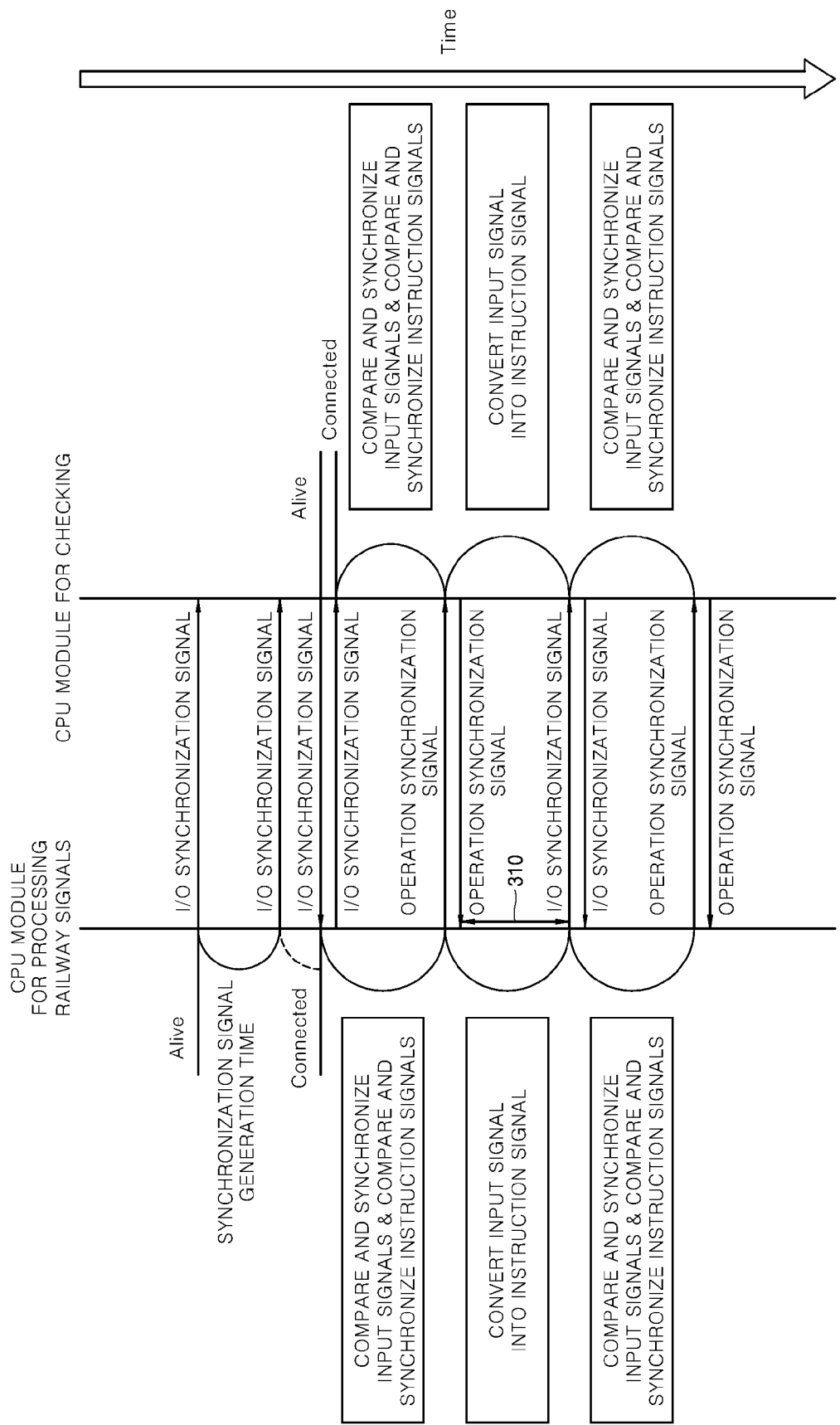
FIG. 4 is a diagram showing procedure that a control unit according to an exemplary embodiment of the present disclosure transmits an I/O synchronization signal or an operation synchronization signal at a predetermined interval.

FIG. 4 shows a procedure that the control unit 160 according to an exemplary embodiment of the present disclosure transmits an I/O synchronization signal or an operation synchronization signal at a predetermined interval 310.

Referring to FIG. 4, the control unit 160 may transmit the I/O synchronization signal to the CPU module 100 and the CPU module 200 to compare and synchronize input signals and to compare and synchronize instruction signals. In addition, the control unit 160 may transmit the operation synchronization signal to the CPU module 100 and the CPU module 200 to convert input signals into instruction signals.

The control unit 160 may transmit the I/O synchronization signal or the operation synchronization signal at the predetermined interval 310. The predetermined interval 310 refers to a period of time between the transmission of the I/O synchronization signal and the transmission of the operation synchronization signal. The interval may be determined by a user and may not be constant.

According to another exemplary embodiment of the present disclosure, a method for synchronizing railway signals may include receiving a first input signal from an external apparatus and receiving a second input signal and a second instruction signal from a CPU module for checking. Then, the method includes comparing the first input signal with the second input signal and outputting a resulting input signal if it is determined that the first input signal is identical to the second input signal.

Then, the method includes converting the resulting input signal into a first instruction signal, and comparing the first instruction signal with a second instruction signal. Then, the method includes outputting a resulting instruction signal if it is determined that the first instruction signal is identical to the second instruction signal. Finally, the method includes controlling operate timing of the first comparison unit, the signal processing unit and the second comparison unit.

As set forth above, according to an exemplary embodiment of the present disclosure, a CPU module for processing railway signals compares a first input signal with a second input signal and compares a first instruction signal with a second instruction signal, thereby outputting reliable signals. In addition, according to an exemplary embodiment of the present disclosure, a CPU module for processing railway signals controls operation timing of the first comparator, a signal processing unit and the second comparator, such that they are synchronized with signals received by a CPU module for checking. Further, according to an exemplary embodiment of the present disclosure, a CPU module transmits an I/O synchronization signal and an operation synchronization signal, such that a comparison unit and a signal processing unit are independently controlled.

The exemplary embodiments of the present disclosure described above may be substituted, altered, and modified by those skilled in the art without departing from the scope and sprit of the present disclosure. Therefore, the present disclosure is not limited to the above-mentioned exemplary embodiments and the accompanying drawings.

What is claimed is:

1. A computing device including a central processing unit (CPU) module for processing railway signals, the CPU module comprising:
    a first signal input unit configured to receive a first input signal from an external apparatus;
    a second signal input unit configured to receive a second input signal and a second instruction signal from a CPU checking module;
    a first signal comparison unit configured to compare the first input signal with the second input signal and output a resulting input signal if it is determined that the first input signal is identical to the second input signal;
    a signal processing unit configured to convert the resulting input signal into a first instruction signal;
    a second signal comparison unit configured to compare the first instruction signal with the second instruction signal and output a resulting instruction signal if it is determined that the first instruction signal is identical to the second instruction signal;
    an operation timing control unit configured to send a synchronization signal for controlling operation timing of the first signal comparison unit, the signal processing unit, the second signal comparison unit, and the CPU checking module;
    wherein the synchronization signal is an input/output (I/O) synchronization signal or an operation synchronization signal;
    wherein the operation timing control unit transmits the I/O synchronization signal or the operation synchronization signal at a predetermined interval;
    wherein the predetermined interval is determined by a user and is not constant;
    wherein the first signal comparison unit receives the I/O synchronization signal from the operation timing control unit and then compares the first input signal with the second input signal, and outputs the resulting input signal if it is determined that the first input signal is identical to the second input signal;
    wherein the signal processing unit receives the operation synchronization signal from the operation timing control unit and then converts the resulting input signal into the first instruction signal;
    wherein the second signal comparison unit receives the I/O synchronization signal from the operation timing control unit and then compares the first instruction signal with the second instruction signal, and outputs the resulting instruction signal if it is determined that the first instruction signal is identical to the second instruction signal; and
    wherein the first instruction signal is at least one of a direction control signal, a barricade open/close signal, a speed control signal and an interval adjustment signal.

2. The computing device of claim 1, further comprising:
    a signal transmission unit configured to transmit the first input signal or the first instruction signal to the CPU checking module.

3. The computing device of claim 1, wherein the operation timing control unit transmits the synchronization signal to the CPU checking module to thereby control operation timing of the CPU checking module.

* * * * *